United States Patent
Kim et al.

(10) Patent No.: US 10,686,231 B2
(45) Date of Patent: Jun. 16, 2020

(54) BATTERY PACK HAVING COOLING STRUCTURE WITH IMPROVED STABILITY FOR USE OF LIQUID COOLANT

(71) Applicant: LG Chem, Ltd., Seoul (KR)

(72) Inventors: Hyun Chan Kim, Daejeon (KR); Byung Doo Min, Daejeon (KR); Juh Hwan Shin, Daejeon (KR)

(73) Assignee: LG Chem, Ltd., Seoul (KR)

( * ) Notice: Subject to any disclaimer, the term of this patent is extended or adjusted under 35 U.S.C. 154(b) by 142 days.

(21) Appl. No.: 15/812,069

(22) Filed: Nov. 14, 2017

(65) Prior Publication Data

US 2018/0151930 A1 May 31, 2018

(30) Foreign Application Priority Data

Nov. 30, 2016 (KR) .................... 10-2016-0161173

(51) Int. Cl.
  *H01M 10/6568* (2014.01)
  *H01M 10/613* (2014.01)
  (Continued)

(52) U.S. Cl.
  CPC ......... *H01M 10/6568* (2015.04); *B60L 50/64* (2019.02); *B60L 50/66* (2019.02);
  (Continued)

(58) Field of Classification Search
  CPC ............ H01M 2/1077; H01M 10/613; H01M 10/625; H01M 10/6552; H01M 10/6556; H01M 10/6568; B60L 50/64; B60L 50/66
  (Continued)

(56) References Cited

U.S. PATENT DOCUMENTS

| 2012/0087091 A1* | 4/2012 | Nassoiy | H01M 10/6556 |
| | | | 361/701 |
| 2014/0011059 A1* | 1/2014 | Hashimoto | H01M 2/1077 |
| | | | 429/72 |

(Continued)

FOREIGN PATENT DOCUMENTS

| JP | 2011-173447 A | 9/2011 |
| KR | 2012-0065026 A | 6/2012 |
| KR | 2015-0100365 A1 | 9/2015 |

OTHER PUBLICATIONS

Korean Office Action dated Feb. 17, 2020, issued in counterpart Korean Patent application No. 10-2016-0161173.

*Primary Examiner* — James M Erwin
(74) *Attorney, Agent, or Firm* — Morgan, Lewis & Bockius LLP (57) ABSTRACT

The present disclosure provides a battery pack comprising: a module assembly having a structure in which a plurality of battery modules is mounted on a cooling plate having an internal hollow structure capable of accommodating a fluid; a pack housing having an inwardly recessed seating portion for mounting of the module assembly, and having an opened upper end; and a coolant circulation system configured to supply a liquid coolant into an internal hollow of the cooling plate to absorb heat of the battery module mounted on the cooling plate, wherein the pack housing includes a drain hose to discharge the liquid coolant that flows out from the coolant circulation system to the outside of the pack housing, and an opening through which the drain hose is mounted is formed on one surface of the pack housing.

18 Claims, 3 Drawing Sheets

(51) Int. Cl.
  *H01M 10/6556* (2014.01)
  *H01M 10/6554* (2014.01)
  *H01M 2/10* (2006.01)
  *H01M 10/625* (2014.01)
  *H01M 10/6552* (2014.01)
  *B60L 50/60* (2019.01)
  *B60L 50/64* (2019.01)

(52) U.S. Cl.
  CPC ....... *H01M 2/1077* (2013.01); *H01M 10/613* (2015.04); *H01M 10/625* (2015.04); *H01M 10/6552* (2015.04); *H01M 10/6554* (2015.04); *H01M 10/6556* (2015.04)

(58) Field of Classification Search
  USPC .......................................................... 429/72
  See application file for complete search history.

(56) References Cited

U.S. PATENT DOCUMENTS

| | | | |
|---|---|---|---|
| 2014/0295223 A1* | 10/2014 | Gendlin | H01M 10/0404 429/62 |
| 2015/0229010 A1* | 8/2015 | Ahn | H01M 10/613 429/120 |
| 2015/0249238 A1* | 9/2015 | Andre | B60K 1/04 429/99 |
| 2016/0372805 A1 | 12/2016 | Kim et al. | |

\* cited by examiner

BATTERY PACK HAVING COOLING STRUCTURE WITH IMPROVED STABILITY FOR USE OF LIQUID COOLANT

CROSS-REFERENCE TO RELATED APPLICATION

This application claims priority to Korean Patent Application No. 10-2016-0161173 filed on Nov. 30, 2016 and all the benefits accruing therefrom under 35 U.S.C. § 119, the contents of which are incorporated by reference in their entirety.

BACKGROUND

The present disclosure relates to a battery pack having a cooling structure with improved stability for use of a liquid coolant.

Recently, a chargeable and dischargeable secondary battery is widely used as an energy source for wireless mobile devices. Further, a secondary battery also attracts attention as a power source for an electric vehicle (EV), a hybrid electric vehicle (HEV), a plug-in hybrid electric vehicle (Plug-In HEV) and the like that are suggested as an alternative to solve air pollution caused by conventional gasoline vehicles and diesel vehicles that are operated on fossil fuel.

While one, two, three or four battery cells are used per one device in compact mobile devices, a battery module in which multiple battery cells are modularized, or a battery pack in which multiple battery modules are electrically connected is used in medium/large-sized devices such as a vehicle for the necessity of high-output power and large-capacity.

Since a medium/large-sized battery module or battery pack is preferably manufactured with as small size and weight as possible, a prismatic battery, a pouch-shaped battery, and the like, which can be laminated with high degree of integration and have small weight to capacity are mainly used as battery cells (unit cell) thereof. Particularly, the pouch-shaped battery using an aluminum laminate sheet as a sheathing member has recently attracted a lot of attention owing to advantages such as low weight, low manufactured cost, and easy deformable properties.

Since battery cells constituting such medium-to-large size battery module or battery pack are composed of chargeable and dischargeable secondary batteries, such high-output large-capacity secondary batteries generate a large amount of heat during a charging and discharging process. Particularly, since the laminate sheet of the pouch-shaped battery is surface-coated with a polymer material having low thermal conductivity, it is difficult to effectively cool the temperature of the entire battery cell.

If the heat generated during the charging and discharging process cannot be effectively removed, heat build-up may occur, thereby accelerating deterioration of the battery cells and possibly causing ignition or explosion thereof depending on cases. Thus, the high-output large-capacity battery module or battery pack requires a cooling system to cool battery cells stored therein.

Such cooling system may largely be configured in a structure of cooling the unit cells included in the battery pack or the unit battery module, or in a structure that a liquid coolant cools the unit battery cell or the unit battery module while moving along a pipe.

Particularly, the cooling system using the liquid coolant is such that the liquid coolant circulates along the pipe, but may absorb the heat of unit battery cells or unit battery modules adjacent to the pipe, thereby accomplishing cooling, and it may be defined as an indirect cooling system in a broad meaning.

Although such cooling system using the liquid coolant has an advantage in that cooling efficiency is excellent, it may incur critical safety problem to the battery pack when the liquid coolant flows out, and therefore it is necessary to design the cooling structure with a very high degree of precision.

Nonetheless, some of the liquid coolant may flow out through joints of the pipes due to fluid pressure of the liquid coolant, and the so outflowed liquid coolant may infiltrate into the unit battery cell, unit battery module, or circuit that constitutes the battery pack to lead to electrical short-circuit, malfunction, and the like.

In some cases, hot air inside the battery pack may be condensed on the pipe surface, and for this reason, the cooling system using a liquid coolant is particularly required to have the safety against moisture.

Therefore, there is a great need for a battery pack having a cooling structure with improved stability for use of liquid coolant.

SUMMARY

It is an object of the present disclosure to solve the above-mentioned problems associated with the prior art, and the technical problems that have been requested from the past.

Specifically, an objective of the present disclosure is to provide a battery pack capable of quickly discharging liquid coolant inevitably flowing out of the inside of the battery pack to the outside without disassembly of the battery pack or a cooling system, thereby preventing problems incurred by the outflow of liquid coolant.

To achieve the objectives, a battery pack according to the present disclosure may include: a module assembly having a structure in which a plurality of battery modules are mounted on a cooling plate having an internal hollow structure capable of receiving a fluid; a pack housing having an inwardly recessed seating portion for mounting of the module assembly, and having an opened upper end; and a coolant circulation system configured to supply a liquid coolant into an internal hollow of the cooling plate to absorb heat of the battery module mounted on the cooling plate, wherein the pack housing may include a drain hose to discharge a liquid coolant that flows out of the coolant circulation system to the outside of the pack housing, and an opening through which the drain hose is mounted may be formed on one surface of the pack housing.

That is, the battery pack according to the present disclosure is capable of easily discharging the liquid coolant through the drain hose without disassembly of components constituting the battery pack although the liquid coolant inevitably flows out of the inside of the battery pack, thereby allowing a prompt action to be taken in the case of outflow of liquid coolant. As a result, the present disclosure may easily prevent the outflow of liquid coolant from infiltrating into a battery module or a circuit member constituting the battery pack, thereby improving stability for a battery pack that uses the liquid coolant.

In a particular example, the pack housing may include a first seating portion and a second seating portion on which module assemblies that are different from each other are seated, and a connecting extension extended between the first seating portion and the second seating portion; the liquid coolant flowing out of the coolant circulation system may converge on the first seating portion and the second seating portion of the pack housing; and the drain hose may be mounted through an opening formed in the pack housing, and may discharge the liquid coolant converged on the seating portions of the pack housing to the outside of the pack housing.

That is, once the liquid coolant flows out, it may be collected inside the pack housing and converges therein, and the liquid coolant so converged may be discharged to the outside through the drain hose.

The drain hose may include: a hose member made of rubber or polymeric resin and configured to provide a flow path for the liquid coolant; a connection member mounted to an opening formed on the outer surface of the pack housing in a state of being connected to one side end of the hose member; and a cap member releasably mounted on the other side end of the hose member, thereby opening or closing the hose member.

If the cap member is in a state of being mounted on the hose member, the drain hose may retain a portion of the outflowed liquid coolant within the hose member.

Conversely, if the cap member is in a state of being released from the hose member, the drain hose may discharge the outflowed liquid coolant to the outside through the hose member.

However, since the converged liquid coolant is required to be naturally moved to the drain hose, the present disclosure provides a structure in which an outflowed liquid coolant is moved in a state of being collected together, if it is within the pack case, to the drain hose regardless of an outflow position thereof, and is discharged through the drain hose, the structure being described in detail below.

In this regard, each of the first seating portion and the second seating portion may include a lower end surface on which the module assembly is seated, and a plurality of side surfaces upwardly extended from the lower end surface to form side surfaces of the pack housing; and the lower end surface may form an inclination respect to the connecting extension, and the outflowed liquid coolant may converge on an inclination ends of the seating portions in a state of being moved along the inclination in an opposite direction to the connecting extension.

Here, since the lower end surfaces of the first and second seating portions may have a structure to form an inclination to be symmetric with each other with respect to the connecting extension, the liquid coolant flowing out of each seating portions may be moved on the lower end surfaces of each seating portions along the inclination.

Further, the side surfaces may be formed with a coupling portion having a plurality of coupling holes formed therein such that the battery pack may be able to be coupled to an external device.

The drain hose may be formed on at least one of the side surfaces adjacent to the inclination ends; the drain hose may be structured to extend from the inside of the seating portion to the outside of the pack housing; and the liquid coolant converged on the inclination end may be discharged from the inside of the seating portion to the outside of the pack housing through the drain hose.

As above, in the battery pack according to the present disclosure, although the liquid coolant flows out of positions that are different from one another, most of the liquid coolant may be slid by the inclination in a state of being collected on the lower end surface of the pack housing, thereby converging on the inclination end. Further, the liquid coolant so converged may be discharged through the drain hose since it is naturally moved by the gravity to the drain hose located on the side surface of the inclination end side.

Further, the above structure has an advantage that, although hot air inside the battery pack is condensed on the surface of pipe to form moisture, the condensed moisture and the liquid coolant may be slid together to converge on the inclination end, and may then be naturally discharged together through the drain hose located on the side surface of the inclination end side by gravity.

If the inclination of the lower end surface is too steep, arrangement of the battery module and the cooling plate is not stable, which is not preferable in view of overall structure of the battery pack. To the contrary, if the inclination is too gentle, it is difficult to substantially achieve the movement of the liquid coolant intended in the present disclosure. In consideration of this, the angle of the inclination is preferably 10 to 30 degrees with respect to the ground surface.

The inventors of the present disclosure have confirmed that the arrangement of the battery module and the cooling plate within the angular range did not exhibit significant difference from the case of horizontal arrangement, thereby being relatively stable, and that the liquid coolant had sufficient mobility.

In a specific example, a plurality of recessed beads may be formed on the lower end surface such that flow of the outflowed liquid coolant is collected inside the lower end surface; and the collected liquid coolant may be moved within the recessed beads along the inclination in the gravity direction.

Such recessed beads may facilitate movement of the liquid coolant to the inclination end by inducing collection of the liquid coolant and inducing the liquid coolant to flow on the lower end surface in a collected state.

Meanwhile, the cooling plate according to the present disclosure may be a thermally conductive metal plate having an internal hollow structure so that the liquid coolant may flow through the inside thereof, and the hollow structure may include a plurality of protrusions for setting a flow path.

The cooling plate may be added with a thermal transfer medium to promote thermal transfer on a surface in close contact with the lower surface of the battery module.

The thermal transfer medium may be at least one selected from the group consisting of thermally conductive grease, thermally conductive epoxy-based band, thermally conductive silicone pads, thermally conductive adhesive tape, and a graphite sheet, but is not limited thereto.

In the present disclosure, the battery module may include at least two unit modules that include a plurality of battery cells, and may have a structure in which a module array is mounted on the plurality of module housing, the module array being the unit modules arrayed in a state in which side surfaces thereof are in close contact with each other.

The battery cell may be a lithium secondary cell such as a lithium-ion cell and a lithium polymer cell having advantages of high energy density, discharge voltage, and output stability, but type thereof is not specially limited.

Generally, a lithium secondary cell is composed of a positive electrode, a negative electrode, a separator, and a lithium salt-containing non-aqueous electrolyte solution.

The positive electrode is prepared, for example, by applying a mixture of a positive electrode active material, a conductive material, and a binder on a positive electrode current collector, and drying the mixture, and a filler may also be added thereto if necessary.

The positive electrode active material may include, but not limited to: a layered compound such as lithium cobalt oxide (LiCoO$_2$) and lithium nickel oxide (LiNiO$_2$), or a compound substituted with one or more transition metal; lithium manganese oxides such as the formula Li$_{1+x}$Mn$_{2-x}$O$_4$ (where x is 0 to 0.33), LiMnO$_3$, LiMn$_2$O$_3$, and LiMnO$_2$; lithium copper oxide (Li$_2$CuO$_2$); vanadium oxides such as LiV$_3$O$_8$, LiFe$_3$O$_4$, V$_2$O$_5$, and Cu$_2$V$_2$O$_7$; Ni site type lithium nickel oxides represented by formula LiN1$_{-x}$M$_x$O$_2$ (where M=Co, Mn, Al, Cu, Fe, Mg, B or Ga, and x=0.01 to 0.3); lithium manganese composite oxide represented by formula LiMn$_{2-x}$M$_x$O$_2$ (where M=Co, Ni, Fe, Cr, Zn or Ta, and x=0.01 to 0.1) or Li$_2$Mn$_3$MO$_8$ (where M=Fe, Co, Ni, Cu or Zn); LiMn$_2$O$_4$ in which a part of Li in the formula is substituted with an alkaline earth metal ion; disulfide compounds; Fe$_2$(MoO$_4$)$_3$ and the like.

Typically, the conductive material is added in an amount of 1 to 30 wt % based on the total weight of the mixture including the positive electrode active material. Such conductive material is not particularly limited if it has electrical conductivity without causing chemical changes in the battery, and may include, for example: natural graphite or artificial graphite; carbon black such as carbon black, acetylene black, Ketjen black, channel black, furnace black, lamp black, and summer black; conductive fibers such as carbon fibers and metal fibers; metal powders such as carbon fluoride, aluminum, and nickel powder; conductive whiskey such as zinc oxide and potassium titanate; conductive metal oxide such as titan oxide; and conductive materials such as polyphenylene derivatives.

The binder is a component which assists in bonding of the active material and the conductive material and in bonding to the current collector, and is usually added in an amount of 1 to 30 wt % based on the total weight of the mixture including the positive electrode active material. Examples of such binder may include polyvinylidene fluoride, polyvinyl alcohol, carboxymethylcellulose (CMC), starch, hydroxypropylcellulose, regenerated cellulose, polyvinylpyrrolidone, tetrafluoroethylene, polyethylene, polypropylene, ethylene-propylene-diene terpolymer (EPDM), sulfonated EPDM, styrene butylene rubber, fluorine rubber, various copolymers and the like.

The filler is optionally used as a component for suppressing expansion of the positive electrode, and is not particularly limited if it is a fibrous material without causing chemical changes in the battery. Examples of the filler may include olefin polymers such as polyethylene and polypropylene; and fibrous materials such as glass fibers and carbon fibers.

The negative electrode may be prepared by applying and drying a negative electrode active material on a negative electrode current collector, and may optionally further include components as described above.

Examples of the negative electrode active material may include: carbon such as non-graphitized carbon and graphite carbon; Li$_x$Fe$_2$O$_3$ (0≤X≤1), Li$_x$WO$_2$ (0≤X≤1), Sn$_x$Me$_{1-x}$Me'$_y$O$_z$ (Me: Mn, Fe, Pb, Ge; Me': B, P, Si, 1 group, 2 group, and 3 group elements of the periodic table, halogen; 0<x≤1; 1≤y≤3; 1≤z≤8); lithium metal; lithium alloy; silicon-based alloys; tin-based alloys; metal oxides such as SnO, SnO$_2$, PbO, PbO$_2$, Pb$_2$O$_3$, Pb$_3$O$_4$, Sb$_2$O$_3$, Sb$_2$O$_4$, Sb$_2$O$_5$, GeO, GeO$_2$, Bi$_2$O$_3$, Bi$_2$O$_4$, and Bi$_2$O$_5$; conductive polymers such as polyacetylene; Li—Co—Ni-based materials and the like.

The separator and a separation film are interposed between the positive electrode and the negative electrode, and an insulative thin film having high ion permeability and mechanical durability is used. The pore diameter of the separator is generally 0.01 to 10 μm and the thickness is generally 5 to 300 μm. Such separator includes, for example: olefin-based polymers such as polypropylene which is chemically resistant and hydrophobic; a sheet or a nonwoven fabric made of glass fiber or polyethylene. When a solid electrolyte such as a polymer is used as the electrolyte, the solid electrolyte may also serve as a separator.

Further, in one specific example, the separator and/or the separation film may be an organic/inorganic composite porous SRS (Safety-Reinforcing Separators) separator to improve the safety of a battery having a high energy density.

The SRS separator is manufactured by using inorganic particles and a binder polymer as an active layer component on a polyolefin-based separator substrate, where a uniform pore structure is formed by interstitial volume between inorganic particles, which are active layer components, and the pore structure included in the separator substrate itself.

When compared with the use of a conventional separator, the use of such organic/inorganic composite porous separators may be advantageous in that an increase in thickness of the battery due to swelling during a formation process is suppressed, and the organic/inorganic composite porous separators may be simultaneously used as an electrolyte if a gellable polymer, which is gellable upon impregnation with a liquid electrolyte, is used as the binder polymer component.

Further, since the organic/inorganic porous separator may exhibit excellent adhesion characteristics by adjusting the contents of the inorganic particles and the binder polymer that are active layer components in the separator, the battery assembly process may be easily performed.

The inorganic particles are not particularly limited if they are electrochemically stable. That is, the inorganic particles usable in the present disclosure are not particularly limited unless oxidation and/or reduction reaction occurs in an operating voltage range of applied battery (for example, 0 to 5 V based on Li/Li+). Particularly, when inorganic particles having an ion-transporting ability are used, the ion conductivity in an electrochemical device may be increased and performance of the device may be improved, and it is thus preferable that the ion conductivity is as high as possible. Further, if the inorganic particles have a high density, it may not be easily dispersed at the time of coating, and may also increase in weight in the battery upon production. Thus, it is preferable that the density is as low as possible. Further, if the inorganic particles are inorganic materials having a high dielectric constant, it may contribute to an increase in dissociation of an electrolyte salt in the liquid electrolyte, such as a lithium salt, thereby improving the ionic conductivity of the electrolytic solution.

The non-aqueous electrolyte solution containing lithium salt is composed of a polar organic electrolyte and lithium salt. A non-aqueous liquid electrolytic solution, an organic solid electrolyte, and an inorganic solid electrolyte are used as an electrolytic solution.

Examples of the non-aqueous liquid electrolytic solution may include an aprotic organic solvent such as, for example, N-methyl-2-pyrrolidinone, propylene carbonate, ethylene carbonate, butylene carbonate, dimethyl carbonate, diethyl carbonate, gamma-butylolactone, 1,2-dimethoxyethane, tetrahydroxyfuran, 2-methyl tetrahydrofuran, dimethylsulfoxide, 1,3-dioxolane, formamide, dimethylformamide, dioxolane, acetonitrile, nitromethane, methyl formate, methyl acetate, phosphoric acid triester, trimethoxy methane, dioxolane derivatives, sulfolane, methyl sulfolane, 1,3-dimethyl-2-imidazolidinone, propylene carbonate derivatives, tetrahydrofuran derivatives, ethers, methyl pyrophosphate, ethyl propionate, ethyl and the like.

Examples of the solid organic electrolyte may include, for example, a polyethylene derivative, a polyethylene oxide derivative, a polypropylene oxide derivative, a phosphate ester polymer, a poly agitation lysine, a polyester sulfide, a polyvinyl alcohol, and a polymer including ionic dissociation groups.

Examples of the inorganic solid electrolyte may include, for example, nitrides, halides and sulfades of Li such as $Li_3N$, $LiI$, $Li_5NI_2$, $Li_3N$—$LiI$—$LiOH$, $LiSiO_4$, $LiSiO_4$—$LiI$—$LiOH$, $Li_2SiS_3$, $Li_4SiO_4$, $Li_4SiO_4$—$LiI$—$LiOH$, $Li_3PO_4$—$Li_2S$—$SiS_2$.

Examples of the lithium salt may include, for example, $LiCl$, $LiBr$, $LiI$, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, chloroborane lithium, lower aliphatic carboxylic acid lithium, lithium 4-phenylborate, imide and the like, which may be well dissolved in the non-aqueous electrolyte.

Further, for the purpose of improving charge-discharge characteristics and flame retardancy, the non-aqueous electrolytic solution may also be added with, for example, pyridine, triethylphosphite, triethanolamine, cyclic ether, ethylenediamine, n-glyme, hexahydrate triamide, nitrobenzene derivatives, sulfur, quinone imine dyes, N-substituted oxazolidinones, N,N-substituted imidazolidine, ethylene glycol dialkyl ether, ammonium salt, pyrrole, 2-methoxy ethanol, and aluminum trichloride. In some cases, a halogen-containing solvent such as carbon tetrachloride, ethylene trifluoride or the like may be further added to impart nonflammability, or a carbon dioxide gas may be further added to improve high-temperature storage characteristics.

The present disclosure also provides a device using the battery pack as a power source.

The device may be any one selected from the group consisting of an electric vehicle, a hybrid electric vehicle, and a plug-in hybrid electric vehicle.

Since the above-described device or devices as are known in the art, a detailed description thereof will be omitted herein.

Advantageous Effect

As described above, a battery pack according to the present disclosure is capable of easily discharging liquid coolant through a drain hose without disassembly of components constituting the battery pack although the liquid coolant inevitably flows out of the inside of the battery pack, thereby allowing a prompt action to be taken in the case of outflow of liquid coolant. As a result, the present disclosure enables the outflowed liquid coolant to be easily prevented from infiltrating into a battery module or a circuit member constituting the battery pack, thereby improving stability for a battery back using the liquid coolant.

DETAILED DESCRIPTION OF EMBODIMENTS

Hereinafter, embodiments of the present disclosure will be described with reference to the drawings. However, this is for a better understanding of the present disclosure, and the scope of the present disclosure is not limited thereto.

Figure 1:
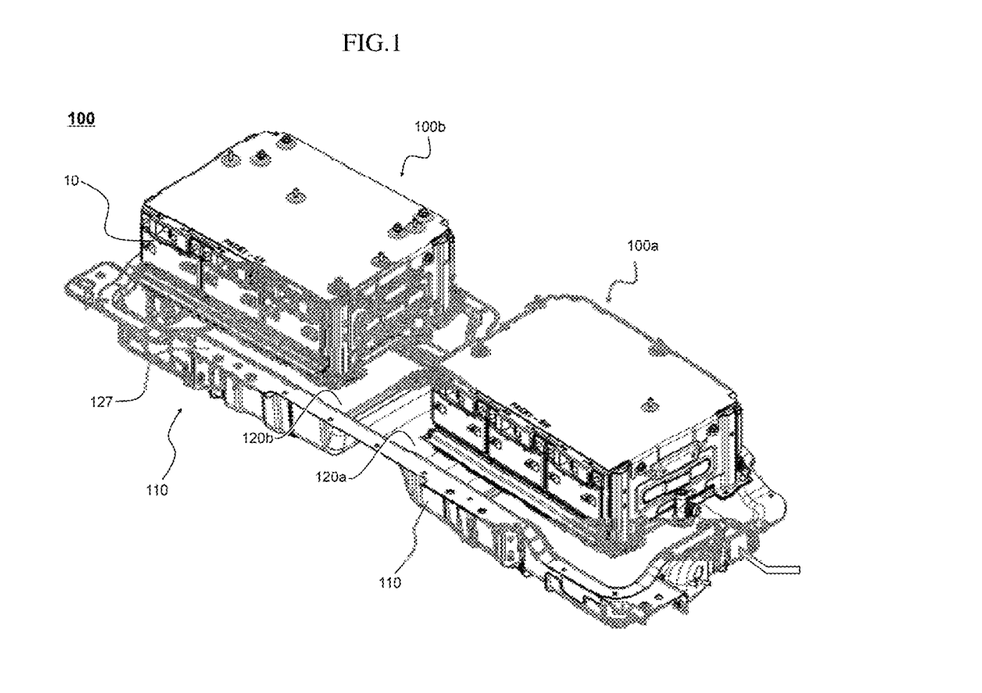
FIG. 1 is a perspective view of a battery pack according to one embodiment of the present disclosure.

In FIG. 1, a perspective view of a battery pack according to one embodiment of the present disclosure is illustrated.

Referring to FIG. 1, a battery pack 100 includes module assemblies 100a, 100b having a structure in which a plurality of battery modules 10 are mounted on a cooling plate (not shown) that has an internal hollow structure capable of receiving a fluid, seating portions 121, 122 having an inwardly recessed shape to allow the module assemblies 100a, 100b to be mounted thereon, a pack housing 110 having an opened upper end, and a coolant circulation system (not shown) supplying a liquid coolant into the internal hollow of the cooling plate for absorbing heat of the battery module mounted on the cooling plate.

Particularly, the battery pack 100 may be mounted on a device, for example, on a lower portion of a vehicle through a joint 127 formed on a side surface of the pack housing 110.

Figure 2:
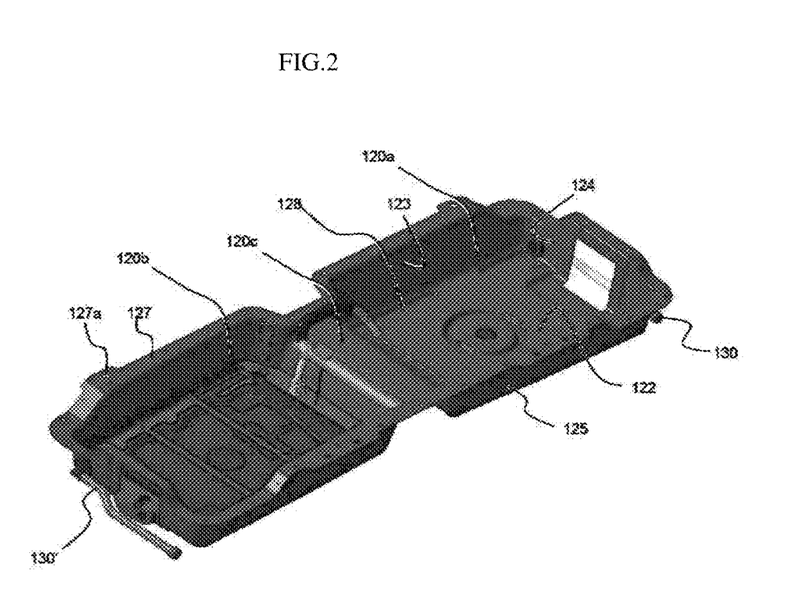
FIG. 2 is a perspective view of a pack housing structure of FIG. 1.
Figure 3:
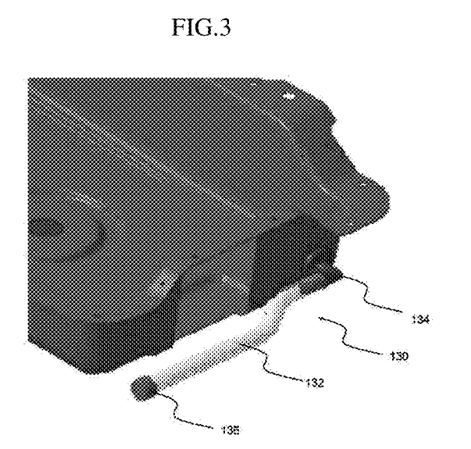
FIG. 3 is a perspective view of a drain hose.
Figure 4:
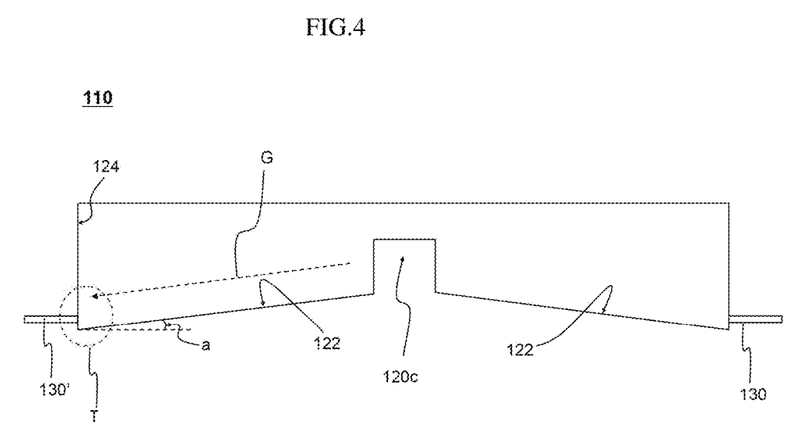
FIG. 4 is a side view of a pack housing.

In FIG. 2, a pack housing structure of FIG. 1 is schematically illustrated, in FIG. 3, a perspective view of a drain hose is illustrated, and in FIG. 4, a side view of the pack housing is illustrated.

Referring to the drawings, the pack housing 110 includes drain hoses 130, 130', a first seating portion 120a and a second seating portion 120b on which module assemblies that are different from each other are mounted, and a connecting extension 120c extending between the first seating portion 120a and the second seating portion 120b.

The drain hoses 130, 130' are made of rubber or polymeric resin respectively, and include a hose member 132 configured to provide a flow path for the liquid coolant, a connection member 134 mounted in an opening formed on the outer surface of the pack housing 110, in a state of being connected to one side end of the hose member 132, and a cap member 136 releasably mounted on the other side end of the hose member 132, thereby opening or closing the hose member 132.

Each of the first seating portion 120a and the second seating portion 120b includes a lower end surface 122 on which the module assemblies 100a, 100b are mounted, and a plurality of side surfaces 123, 124 and 125 extending from the lower end surface 122 to form side surfaces of the pack housing 110. Hereinafter, constituents of the first seating portion 120a and the second seating portion 120b will not be separately delimited, but will be described as an integrated reference numeral for the convenience.

As described above, the side surfaces 123, 124 and 125 includes a plurality of coupling holes 127a for mounting of the battery pack 100 on an external device, and a coupling portion 127 bent to be in close contact with one surface of the external device.

In such a structure, if a liquid coolant flows out of the coolant circulation system, the liquid coolant will converge within the first seating portion 120a and the second seating portion 120b of the pack housing 110.

Since the drain hose 130 is mounted in the opening formed in the seating portions 120a, 120b even in the pack housing 110, it may discharge the liquid coolant converged on the seating portions of the pack housing 110 to the outside of the pack housing 110.

That is, once the liquid coolant flows out, it converges while being collected in the pack housing 100, and the liquid coolant thus converged may be discharged to the outside through the drain hose 130.

Here, the lower end surface 122 is inclined with respect to the connecting extension 120c in the side surface direction Can inclination end') which is an opposite direction to the connecting extension. Such an inclination angle is a predetermined angle a that the lower end surface 122 forms with respect to the ground surface.

Therefore, if a liquid fluid is collected on the lower end surface 122, the liquid fluid will slide along the inclination of the lower end surface 122 by gravity to be moved towards the inclination end T, then will be collected at the inclination end T. The inclination end T refers to a portion of the seating portions 120a, 120b closest to the ground surface with respect to the ground surface, among the seating portions 120a, 120b formed by the lower end surface 122 and the side surfaces 123, 124 and 125, and corresponds to the region T in the drawing.

Further, a plurality of recessed beads 128 are formed on the lower end surface such that flow of the outflow of the liquid coolant is collected within the lower end surface 122.

These recessed beads 128 may facilitate the movement of the liquid coolant to the inclination end T by merging the liquid coolant and inducing the liquid coolant to flow on the lower end surface 128 in a state of being collected together.

According to the present invention, drain hoses 130, 130' are formed on a side surface 124, which forms an outermost end surface in the side view of FIG. 3, among side surfaces 123, 124, 125 adjacent to the inclination end T.

Further, the lower end surface 122 of the first seating portion 120a and the lower end surface 122 of the second seating portion 120b are inclined to be symmetric with each other with respect to the connecting extension 120c. Thus, the liquid coolant flowed out of each seating portions 120a, 120b is moved on the lower end surface 122 of each of the seating portions 120a, 120b along the inclination, and collected at the inclination end T of each seating portions 120a, 120b. In this state, the liquid coolant is naturally moved by gravity to the drain hoses 130, 130' located on the side surface of the inclination end T side, and may thus be discharged through the drain hoses 130, 130'.

As described above, in the battery pack 100 according to the present disclosure, since the liquid coolant in a state of being collected on the lower end surface 122 of the pack housing 110 may be slid by the inclination, and converged on the inclination end T to be discharged through the drain hoses 130, 130' although the liquid coolant flows out of positions of the cooling circulation system that are different from each other, the outflow of the liquid coolant may be prevented without disassembly of components constituting the battery pack 100. Since the liquid coolant is repeatedly removed from the pack case if the discharge through the drain hose 130 is performed periodically, a critical safety problem due to the liquid coolant may be prevented in advance.

In particular, this will be more useful for a battery pack 100 mounted in a vehicle.

Figure 5:
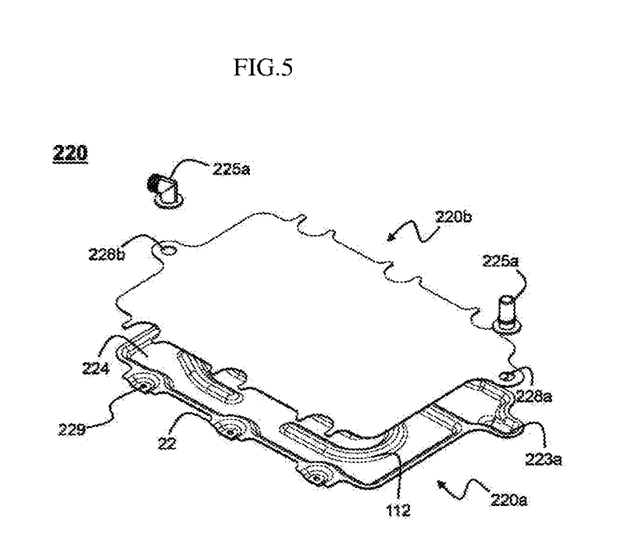
FIG. 5 is an exploded perspective view of a cooling plate according to one embodiment of the present disclosure.
Figure 6:
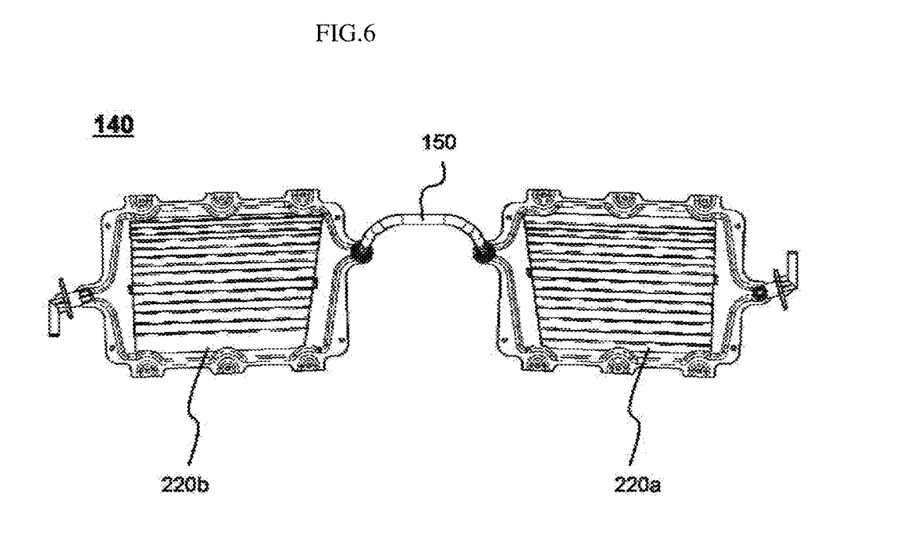
FIG. 6 is a schematic view of a cooling system according to one embodiment of the present disclosure.

FIG. 5 sows a schematic view of a cooling plate according to an embodiment of the present disclosure, and FIG. 6 shows a schematic view of a portion of the coolant circulation system.

Referring to the drawings, the cooling plate 220 is made of a thermal conductive metal plate having a hollow internal structure such that the liquid coolant can flow through therethrough. More particularly, the cooling plate 220 is composed of a first plate 220a and a second plate 220b, and the first plate 220a and the second plate 220b are coupled to each other to form a hollow structure therebetween.

The first plate 220a is formed with a recessed portion 224 which is recessed from one surface to the other surface facing thereto, and a liquid coolant inflow channel 223a and a liquid coolant discharge channel 223b having a structure communicating with the recessed portion 224 formed around outer periphery of both sides thereof that are facing each other.

The second plate 220b has a structure to cover the recessed portion 224 of the first plate 220a such that the recessed portion is isolated from the outside, and in detail, has a structure with a size and a shape corresponding to the inside of the recessed portion 224 other than a plurality of penetration holes 229 formed around the outer periphery 22 of the first plate 220a.

Further, some portions of the outer periphery of the second plate 220b corresponding to the channels 223a, 223b of the first plate 220a are structured to outwardly protrude, and openings 228a, 228b are perforated in the some portions, and a coolant inflow hole 225a and a coolant discharge hole 225b for connection with the coolant pipe are coupled to the openings 228a, 228b.

In the recessed portion 224 of the first plate 220a, a plurality of uneven portions 112 are protruded in one surface direction in which the second plate 220b is located so as to maximize a flow distance while, at the same time, splitting the fluid flow of the liquid coolant from the coolant inflow hole 225a to the coolant discharge hole 225b.

Accordingly, when the first plate 220a and the second plate 220b are coupled, the protrusions 112 are in close contact with the one surface of the second plate 220b to form a flow path of a hollow structure in which the liquid coolant flows between the protrusions 112, and the liquid coolant flows along the flow path while being guided by the protrusions 112.

Particularly, in the present disclosure, each of the protrusions 112 formed on the first plate 220a has different shape, respectively, and due to this, a whirlpool that the liquid coolant is irregularly split at the protrusions 112 is generated to more rapidly spread the liquid coolant, thereby increasing the cooling efficiency of the cooling plate 220.

As shown in FIG. 6, such a cooling plate is mounted on the first seating portion 120a and the second seating portion 120b, and the first cooling plate 220a and the second cooling plate 220b having the same structure may be coupled by the connecting pipe 150 to constitute the coolant circulation system 140.

However, the coolant circulation system 140 may further include members such as a coolant storage, a compressor, and pump circulation pipes, and description for these is omitted for the convenience.

The connecting pipe 150 is located on the connecting extension 120c of the pack housing 110 as shown in FIG. 2, and is a flow path in which the liquid coolant flows from the first cooling plate 220a to the second cooling plate 220b, or vice versa.

After inflow in the connecting portion connected to the coolant inflow hole of the first cooling plate 220a, the liquid coolant cools down the battery module while flowing through the first cooling plate 220a, and is flowed in the connecting portion connected to the coolant inflow hole of the second cooling plate 220b through the connecting pipe 150 connected to the coolant discharge hole of the second cooling plate 220a. Afterwards, the liquid coolant may circulate the second cooling plate 220b in the same manner as in the first cooling plate 220a, and may be discharged through the discharge hole of the second cooling plate 220b.

It will be possible that various applications and changes may be performed by those of ordinary skill in the art based on details as described above without departing from the scope of the present invention.

What is claimed is:

1. A battery pack comprising:
a module assembly having a structure in which a plurality of battery modules are mounted on a cooling plate having an internal hollow structure capable of accommodating a fluid;
a pack housing having an inwardly recessed seating portion for mounting of the module assembly, and having an opened upper end; and
a coolant circulation system configured to supply a liquid coolant into an internal hollow of the cooling plate to absorb heat of the battery module mounted on the cooling plate;
wherein the pack housing comprises a drain hose to discharge the liquid coolant that flows out of the coolant circulation system to the outside of the pack housing, and an opening through which the drain hose is mounted is formed on one surface of the pack housing,
wherein the drain hose comprises:
a hose member configured to provide a flow path for the liquid coolant;
a connection member mounted to the opening formed on the outer surface of the pack housing in a state of being connected to one side end of the hose member; and
a cap member releasably mounted on the other side end of the hose member, thereby opening or closing the hose member.

2. The battery pack of claim 1,
wherein the pack housing comprises a first seating portion and a second seating portion on which module assemblies that are different from each other are seated, and a connecting extension extended between the first seating portion and the second seating portion;
the liquid coolant flowing out of the coolant circulation system converges on the first seating portion and the second seating portion of the pack housing; and
the drain hose is mounted through the opening formed in the pack housing, and discharges the liquid coolant converged on the seating portions of the pack housing to the outside of the pack housing.

3. The battery pack of claim 2,
wherein each of the first seating portion and the second seating portion comprises:
a lower end surface on which the module assembly is seated, and
a plurality of side surfaces upwardly extended from the lower end surface to form side surfaces of the pack housing; and
the lower end surface of each of the first seating portion and the second seating portion forms an inclination with respect to the connecting extension, and the outflowed liquid coolant converges on inclination ends of the seating portions in a state of being moved along the inclination in an opposite direction to the connecting extension.

4. The battery pack of claim 3,
wherein the drain hose is formed on at least one of the side surfaces adjacent to the inclination ends;
the drain hose is structured to extend from the inside of the seating portion to the outside of the pack housing; and
the liquid coolant converged on the inclination end is discharged from the inside of the seating portion to the outside of the pack housing through the drain hose.

5. The battery pack of claim 3, wherein the lower end surface of the first seating portion and the lower end surface of the second seating portion form an inclination to be symmetric with each other with respect to the connecting extension.

6. The battery pack of claim 3, wherein the inclination has an angle of from 10 to 30 degrees with respect to the ground surface.

7. The battery pack of claim 3,
wherein a plurality of recessed beads is formed on the lower end surface of each of the first and second seating portions such that flow of the outflowed liquid coolant is collected inside the lower end surface of each of the first and second seating portions; and
the collected liquid coolant is moved within the recessed beads along the inclination in the gravity direction.

8. The battery pack of claim 3, wherein a coupling portion having a plurality of coupling holes formed therein is formed on the side surfaces such that the battery pack is able to be coupled to an external device.

9. The battery pack of claim 2, wherein the hose member is made of rubber or polymeric resin.

10. The battery pack of claim 9, wherein the drain hose retains a portion of the outflowed liquid coolant in the hose member in a state in which the cap member is mounted on the hose member.

11. The battery pack of claim 9, wherein the drain hose discharges the outflowed liquid coolant to the outside through the hose member in a state in which the cap member is released from the hose member.

12. The battery pack of claim 1, wherein the cooling plate is a thermally conductive metal plate having an internal hollow structure so that the liquid coolant may flow through the inside thereof, and the hollow structure is formed with a plurality of protrusions for setting the flow path.

13. The battery pack of claim 1, wherein the cooling plate further comprises a thermal transfer medium to promote thermal transfer on a surface in close contact with the lower surface of the battery module.

14. A device using a battery pack according to claim 1 as a power source.

15. The battery pack of claim 1, further comprising:
the internal hollow structure of the cooling plate including a plurality of protrusions that configure a curved flow path for the liquid coolant from an inflow hole through which the liquid coolant is input to a discharge hole through which the liquid coolant is output.

16. The battery pack of claim 15, wherein each of the protrusions has a different shape.

17. The battery pack of claim 15, wherein:
the cooling plate includes a first cooling plate and a second cooling plate;
the first cooling plate and the second cooling plate are connected to each other by a connecting pipe; and
the connecting pipe configures a flow path in which the liquid coolant flows from the first cooling plate to the second cooling plate, or from the second cooling plate to the first cooling plate.

18. The battery pack of claim 17, wherein the battery pack is configured such that:

the liquid coolant flows into the inflow hole of the first cooling plate, through the curved flow path of the first cooling plate, and into the discharge hole of the first cooling plate;

the liquid coolant flows from the discharge hole of the first cooling plate, through the connecting pipe, and into the inflow hole of the second cooling plate; and the liquid coolant flows from the inflow hole of the second cooling plate, through the curved flow path of the second cooling plate, and into the discharge hole of the second cooling plate.

* * * * *